(12) United States Patent
Permeh et al.

(10) Patent No.: US 10,354,067 B2
(45) Date of Patent: *Jul. 16, 2019

(54) RETENTION AND ACCESSIBILITY OF DATA CHARACTERIZING EVENTS ON AN ENDPOINT COMPUTER

(71) Applicant: Cylance Inc., Irvine, CA (US)

(72) Inventors: Ryan Permeh, Irvine, CA (US); Matthew Wolff, Laguna Niguel, CA (US); Samuel John Oswald, Portland, OR (US); Xuan Zhao, Irvine, CA (US); Mark Culley, Irvine, CA (US); Steve Polson, Irvine, CA (US)

(73) Assignee: Cylance Inc., Irvine, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/356,029

(22) Filed: Nov. 18, 2016

(65) Prior Publication Data
US 2017/0249462 A1    Aug. 31, 2017

Related U.S. Application Data

(63) Continuation of application No. 15/354,966, filed on Nov. 17, 2016.
(Continued)

(51) Int. Cl.
G06F 21/00 (2013.01)
H04L 29/06 (2006.01)
(Continued)

(52) U.S. Cl.
CPC ............ *G06F 21/56* (2013.01); *G06F 21/552* (2013.01); *G06F 21/554* (2013.01); *G06F 21/64* (2013.01);
(Continued)

(58) Field of Classification Search
CPC ........ G06F 21/56; G06F 21/554; G06F 21/64; G06F 21/552; G06F 2221/2101; G06N 99/005; G06N 5/04; H04L 9/30
See application file for complete search history.

(56) References Cited

U.S. PATENT DOCUMENTS 6,967,612 B1    11/2005  Gorman et al.
9,516,053 B1    12/2016  Sudhakar et al.
(Continued)

FOREIGN PATENT DOCUMENTS

EP    2667337 A2 *  11/2013  ......... G06F 21/6245
WO   2016/109005 A2    7/2016
(Continued)

OTHER PUBLICATIONS

Bruce Schneier, John Kelsey; "Secure audit logs to support computer forensics"; ACM Transactions on Information and System Security (TISSEC): vol. 2 Issue 2, May 1999; Publisher: ACM; pp. 159-176 (Year: 1999).*
(Continued)

*Primary Examiner* — Kendall Dolly
*Assistant Examiner* — Courtney D Fields
(74) *Attorney, Agent, or Firm* — Jones Day

(57) ABSTRACT

An endpoint computer system can harvest data relating to a plurality of events occurring within an operating environment of the endpoint computer system and can add the harvested data to a local data store maintained on the endpoint computer system. In some examples, the local data store can be an audit log and/or can include one or more tamper resistant features. Systems, methods, and computer program products are described.

18 Claims, 5 Drawing Sheets

Related U.S. Application Data

(60) Provisional application No. 62/300,621, filed on Feb. 26, 2016.

(51) Int. Cl.

| | | |
|---|---|---|
| *G06F 21/55* | (2013.01) | |
| *G06F 21/56* | (2013.01) | |
| *G06N 20/00* | (2019.01) | |
| *G06N 5/04* | (2006.01) | |
| *H04L 9/30* | (2006.01) | |
| *G06F 21/64* | (2013.01) | |
| *G06Q 10/08* | (2012.01) | |

(52) U.S. Cl.
CPC ............... *G06N 5/04* (2013.01); *G06N 20/00* (2019.01); *H04L 9/30* (2013.01); *G06F 2221/2101* (2013.01)

(56) References Cited

U.S. PATENT DOCUMENTS

| | | | |
|---|---|---|---|
| 2007/0033273 | A1 | 2/2007 | White et al. |
| 2009/0089592 | A1 | 4/2009 | Kudo |
| 2014/0189776 | A1 | 7/2014 | Diehl |
| 2014/0215621 | A1 | 7/2014 | Xaypanya et al. |
| 2015/0163121 | A1 | 6/2015 | Mahaffey et al. |
| 2016/0080397 | A1 | 3/2016 | Bacastow et al. |
| 2016/0127417 | A1* | 5/2016 | Janssen ................... H04L 63/20 726/1 |
| 2016/0330180 | A1* | 11/2016 | Egorov ............... G06F 21/6227 |
| 2017/0134397 | A1 | 5/2017 | Dennison et al. |
| 2017/0249461 | A1 | 8/2017 | Permeh et al. |
| 2018/0196942 | A1 | 7/2018 | Kashyap et al. |
| 2018/0316691 | A1 | 11/2018 | Strong et al. |
| 2018/0316708 | A1 | 11/2018 | Strong et al. |

FOREIGN PATENT DOCUMENTS

| | | | |
|---|---|---|---|
| WO | 2017/147300 | A1 | 8/2017 |
| WO | 2018/132425 | A1 | 7/2018 |
| WO | 2018/200451 | A1 | 11/2018 |
| WO | 2018/200458 | A1 | 11/2018 |

OTHER PUBLICATIONS

Hodo et al., "Shallow and Deep Networks Intrusion Detection System: A Taxonomy and Survey," Jan. 9, 2017 (Jan. 9, 2017), Retrieved from the Internet: URL: https://arxiv.org/ftp/arxiv/papers/1701/1701.02145.pdf [retrieved on Mar. 3, 2018].

Mishra et al., "Intrusion detection techniques in cloud environment: A survey," Journal of Network and Computer Applications 77:18-47 (2016).

Mohan et al., "Complex Event Processing Based Hybrid Intrusion Detection System," 2015 3rd International Conference on Signal Processing, Communication and Networking (ICSCN), IEEE, Mar. 26, 2015 (Mar. 26, 2015), pp. 1-6, [retrieved on Mar. 13, 2018].

Patcha et al., "An overview of anomaly detection techniques: Existing solutions and latest technological trends," Computer Networks 51(12):3448-3470 (2007).

Patent Cooperation Treaty International Search Report for International Application No. PCT/US2018/013093, dated Mar. 26, 2018 (4 pages).

Patent Cooperation Treaty International Search Report for International Application No. PCT/US2018/029051, dated Jul. 11, 2018 (5 pages).

Patent Cooperation Treaty Written Opinion of the International Searching Authority for International Application No. PCT/US2018/013093, dated Mar. 26, 2018 (6 pages).

Patent Cooperation Treaty Written Opinion of the International Searching Authority for International Application No. PCT/US2018/029051, dated Jul. 11, 2018 (10 pages).

Vasudeo et al., "IMMIX-intrusion detection and prevention system," 2015 International Conference on Smart Technologies and Management for Computing, Communication, Controls, Energy and Materials (ICSTM), IEEE, May 6, 2015 (May 6, 2015), pp. 96-101, [retrieved on Aug. 26, 2015].

Angelini et al., "An Attack Graph-based On-line Multi-Step Atack Detector," Proceedings of the 19th International Conference on Distributed Computing and Netoworking, Association for Computing Machinery, Jan. 4-7, 2018, pp. 1-10.

Patent Cooperation Treaty, International Search Report for for International Application PCT/US2018/029041, dated Jun. 13, 2018 (5 pages).

Patent Cooperation Treaty, Written Opinion of the International Searching Authority for International Application PCT/US2018/029041, dated Jun. 13, 2018 (10 pages).

Patent Cooperation Treaty, International Search Report for for International Application PCT/US2017/019142, dated Jul. 7, 2017 (6 pages).

Patent Cooperation Treaty, Written Opinion of the International Searching Authority for International Application PCT/US2017/019142, dated Jul. 7, 2017 (9 pages).

* cited by examiner

RETENTION AND ACCESSIBILITY OF DATA CHARACTERIZING EVENTS ON AN ENDPOINT COMPUTER

CROSS-REFERENCE TO RELATED APPLICATION

This application is a continuation under 35 U.S.C. § 120 of U.S. patent application Ser. No. 15/354,966 filed on 17 Nov. 2016, which claims priority under 35 U.S.C. § 119(e) to U.S. Provisional Application No. 62/300,621 filed Feb. 26, 2016, the disclosures of both of which are incorporated herein by reference in their entireties.

TECHNICAL FIELD

The subject matter described herein relates to approaches for retaining and providing accessibility to data characterizing events occurring in a computing environment on an endpoint computer.

BACKGROUND

Detection and/or interdiction (e.g. prevention of execution, downloading, opening or the like or restriction of access rights to unsecured parts of an execution or computing environment such as the main memory, local or networked storage, the operating system, etc.) of potentially dangerous code objects, such as malware, viruses, and other unwanted or untrusted objects, executables, etc., in a software execution environment (e.g. a computer, a server, a mobile device, etc.) may be performed as part of cybersecurity and threat detection, prevention, and/or evaluation strategies. For example, actions performed by or events relating to a computer may be recorded and/or analyzed to provide visibility into factors affecting safe execution, downloads, etc. as well as for characterizing the performance of applications running on a computer, etc.

Retention of data characterizing a history of the operating environment of an endpoint computer (e.g. a desktop or laptop computer, a mobile device such as a phone or a tablet computer, or any other kind of computer device that executes software) including, but not limited to the time preceding and/or during a threat, an attack, a period of less than optimal execution performance, or any other time during which data about events occurring within or relating to the computing environment of the endpoint computer, can be useful in diagnosing one or more of a source, a responsible party, a magnitude of a potential threat, a etc. of malicious code and/or other forms of threats or cyber attacks and can also assist in improving the effectiveness of detection and prevention efforts in addition to providing a record that can be useful in identifying and/or repairing those software components and/or data affected by a threat. Furthermore, retention of such data can be useful in supporting investigations into any type of potentially interesting event or sequence of events on or concerning the endpoint computer, not necessarily limited to threats or malicious code.

Efforts to retain such data can be an important part of computer forensics, which can include processes of examining a system to find malicious code and/or remnants of a malicious attack or other surreptitious activity (e.g. threads, processes, executable files, or the like) that perform unwanted or otherwise damaging operations that may affect a computer, a group of computers, a network, etc.

SUMMARY

In one aspect, a computer-implemented approach for retaining data characterizing events on an endpoint computer and making these retained data available for further operations includes computer-implemented operations in which the endpoint computer system harvests data relating to a plurality of events occurring within an operating environment of the endpoint computer system. The harvesting includes receiving and/or inferring the data using one or more sensors executing on the endpoint computer system. The data are added to a local data store maintained on the endpoint computer system. A query response is generated in response to a query. The generating includes identifying and retrieving responsive data from the local data store. The responsive data are related to an artifact on the endpoint computer system and/or to an event of the plurality of events. As discussed below, an artifact can refer to any kind of digital item of interest (e.g. for forensic assessment of occurrences such as malware attacks, software errors, performance issues, etc.) and can include one or more of files, programs, system characteristics, and the like.

In a related aspect, a computer-implemented approach for retaining data characterizing events on an endpoint computer and making these retained data available for further operations includes computer-implemented operations in which the endpoint computer system harvests data relating to a plurality of events occurring within an operating environment of the endpoint computer system. The harvesting includes receiving and/or inferring the data using one or more sensors executing on the endpoint computer system. The data are added to a local data store maintained on the endpoint computer system. A query response is generated in response to a query. The generating includes identifying and retrieving responsive data from the local data store. The responsive data are related to an artifact on the endpoint computer system and/or to an event of the plurality of events. In this aspect, the local data store includes an audit log. The audit log includes a series of data containers, and each data container in the series includes a tamper resistant feature. Currently generated data are stored in a current data container of the series while preceding data containers in the series are closed to further write operations. A query response can optionally be generated in response to a query. The generating can include identifying and retrieving responsive data from the local data store. The responsive data can be related to an artifact on the endpoint computer system and/or to an event of the plurality of events.

In optional variations, one or more of the following features can be included in any feasible combination. For example, the harvesting can further include receiving and/or inferring at least some of the data using additional data generated external to the endpoint computer system. The adding of the data to the local data store can further include determining, based on one or more criteria, to retain in the local data store a first subset of the data as more likely to be relevant and to exclude from the local data store and a second subset of the data as more likely to be irrelevant. The event can include an action occurring on the endpoint computer system and involving one or more artifacts on the endpoint computer system. The event can include a capture of what occurred at a specific point in time relating to the at least one artifact.

The responsive data can include one or more of one or more times that a particular file was accessed on the endpoint computer system, how the particular file was used on the endpoint computer system, when the particular file was first detected on the endpoint computer system, location of a registry persistence point, and use of a registry by a software routine to allow itself to persist after a reboot of the endpoint computing system. The generating the response can include mitigating an amount of the data returned as part of the responsive data. The mitigating can include interpreting the query at the endpoint computer system and focusing on specific data of the responsive data that are most likely to be relevant to a subject of the query. The mitigating of the amount of the data returned can further include pruning the data to a reduced data set. The pruning can include analyzing the data with a machine learning model running on the endpoint computer system and/or on one or more remote servers. The analyzing can include the machine learning model enriching the data according to a likelihood of events of the plurality of events or artifacts on the endpoint being having forensic relevance.

The one or more sensors can include at least one of a kernel mode collector, a removable media sensor, a sensor that collects data about a current state of a computing environment executing on the endpoint computer, a malware detection and/or interdiction process, a user authentication process, and a user authentication re-verification process.

The operations can optionally further include one or more of receiving the query from a server over a network connection, initiating the query based on detection of a factor by a malware detection and/or interdiction process and/or by a user authentication verification process, and analyzing the raw forensic data by a machine learning model running on the endpoint compute system. The analyzing can include the machine learning model eliminating first data from the data that are not likely to be relevant, identifying second data from the data that are likely to be relevant, and classifying third data that are not the first data or the second data as potentially relevant. In some variations, the operations can further include discarding the first data and pushing the second data and the third data to a cloud-based, second machine learning model for further analysis. In further possible variations, the operations can additionally or alternatively include receiving the query at the endpoint computer system from the cloud-based, second machine learning model and responding to the query using the second data and the third data based on attributes specified in the query. In still further possible variations, the operations can additionally or alternatively include the machine learning model building a causality chain over one or more forensically applicable events from the plurality of events. The one or more forensically applicable events can be applicable to a given event and/or artifact specified in the query. The building of the causality chain can include consideration of definitions for the first data, the second data, and the third data.

The operations can further include triggering the generating of the query response in reaction to detection of a suspicious artifact and/or a significant event by a malware detection and/or interdiction process executing on the endpoint computer system and/or by an user authentication verification process. Alternatively or in addition, the operations can further include triggering the generating of the query response in reaction to detection of a suspicious file and/or a suspicious event by a malware detection and/or interdiction process executing not on the endpoint computer system and/or by an user authentication verification process.

The operations can further include harvesting the data according to a first set of data collection criteria, determining, via a threat detection module, that a heightened level of alert is necessary, and in response to the a heightened level of alert, harvesting the data according to a second set of data collection criteria that are broader than the first set of data collection criteria. The threat detection module can include a machine learning component. The machine learning component can perform at least one operation selected from determining that the heightened level of alert is necessary, blocking or terminating execution of a process or thread, and determining that the alert level can be lowered back to the first set of data collection criteria. The machine learning component can accomplish the at least one operation by processing data already in the local data store to determine that a potentially undesirable event has occurred and/or by processing the harvested data as it is received to determine that a potentially undesirable event is currently occurring.

In other optional variations relating to the local data store including an audit log, one or more of the following features can be included in any feasible combination. The operations can further include detecting that the audit log has been compromised based on a change in the tamper resistant feature. The tamper resistant feature can include a cryptographic fingerprint that references at least one prior data container in the series, and the change in the tamper resistant feature can include a data container of the series of data containers being referenced in the cryptographic fingerprint of a following data container but no longer being present in the audit log. The tamper resistant feature can include data compression and signing with a public key and/or enciphering of a combination of the data container plus a signature comprising the public key. The operations can further include taking an action based on the detecting that the audit log has been compromised. The action can include one or more of: quarantining a thread, process, and/or routine responsible for the compromising of the audit log; and protection and/or other prevention of corruption of the forensic data that are used to generate the audit log and local cache. The audit log and the local cache can both be stored on the endpoint computer system. Each data container of the series of data containers in the audit log can be encrypted and the forensic data can be written to the current data container in an append-only manner.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include computer hardware (e.g. one or more processors and one or more memories coupled to the one or more processors) to perform the operations described herein. A memory, which can include a non-transitory computer-readable or machine-readable storage medium, may include, encode, store, or the like one or more programs that cause one or more processors to perform one or more of the operations of the methods summarized above and described in more detail elsewhere herein. Computer implemented methods and/or other operations consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to threat detection and/or prevention in a computer endpoint operating environment, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
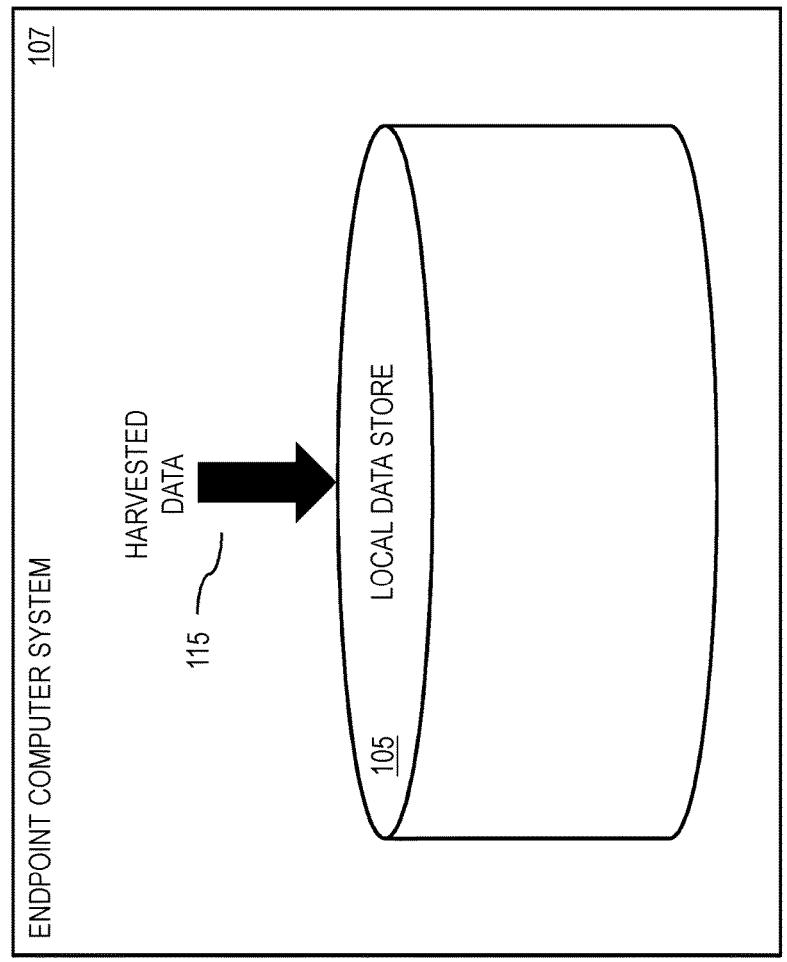
FIG. 1 shows a diagram illustrating features of a data recording approach consistent with implementations of the current subject matter.

Current approaches to retaining data regarding potential software-based attacks on a computer generally rely on transmission of data from one or more computer endpoints (which can include, without limitation, laptop or desktop computers, smartphones, tablets, other computing devices, and the like) to a server machine where the data are stored and, if necessary, analyzed, aggregated, etc. Such tactics are generally considered necessary to ensure reliability and security of the collected data (e.g. to ensure that actions of a cyber threat or other attempts to obscure the causes and/or effects of such a threat are not able to delete or corrupt the forensic data). However, maintaining these "forensic" data on a remote system can lead to various disadvantages, such as for example the need to transmit a large amount of data over a network from endpoint computers to one or more remote servers. Furthermore, use of a cloud-based service for such an approach can require the transmission of potentially sensitive data (e.g. the finalized result of an analysis and/or a data aggregation performed at an endpoint computer) regarding computer actions at the endpoint computer, which can be undesirable for various enterprises. An alternative solution consistent with existing approaches can include the use of one or more firewalled servers to which such data are transmitted and on which these data are retained. As used herein, the term "forensic data" refers generally to any data characterizing events, files in a computing environment of one or more endpoint computers. At its broadest limit, any data relating to artifacts, events, etc. on an endpoint computer can be included in the term "forensic data." Forensic data are also generally referred to herein as "data" or "data relating to events occurring within an operating environment of an endpoint computer system."

When an "unauthorized" piece of software tries to execute or when some other form of a cyber threat is detected, execution or other operations of such a threat can be stopped, for example using one or more threat identification, detection, and/or prevention technologies. In other examples, actions relating to user authentication and/or re-verification of user authentication for a user who has previously been authenticated for access to one or more system resources (e.g. operating system access, ability to execute one or more applications or other programs, ability to read to/write from/execute within system memory, access to data and/or other information/files/programs on storage devices, network resource usage, etc.) of the endpoint computer system and/or of a network to which the endpoint computing system is connected or otherwise able to access.

As used herein, the term user authentication or user authentication process generally refers to any type of credential verification and/or multi-factor authentication process that may be employed on an endpoint computer system and/or over a network to verify the identity and permissions of a user to access various system resources. Authentication re-verification or an authentication re-verification process generally refers to analysis of a user's interaction with a system and/or network and/or to other factors that can be indicative of a potentially incorrect authentication of the user. In certain implementations of a re-verification process, detection of anomalous behaviors and/or other factors indicative of an error in authentication can cause a user to be required to repeat an authentication process, optionally with a heightened validation or authentication requirement.

FIG. 1 shows a diagram 100 illustrating features of a local data store 105 maintained on an endpoint computer system 107 and configured to perform operations consistent with implementations of the current subject matter. As shown, data 115 relating to events occurring within an operating environment of the endpoint computer system are harvested and added to the local data store 105. The local data store 105 is available for use in generating query responses from a variety of potential originators of queries, which are described in more detail below.

The current subject matter is not dependent on any specific type of threat protection technique, authentication verification or re-verification protocol, or security approaches. Rather, such other processes running on the endpoint computer system and/or over a network connection accessible to the endpoint computer system can be used to trigger various activities relating to one or more of harvesting of data relating to events occurring within an operating environment of the endpoint computer system, causing generation of query responses based on the data in the local data store maintained at the endpoint computer system, and the like.

The data harvesting and storing operations described herein can be used to create a standalone record of actions on an endpoint computer without any type of threat detection or prevention, authentication, etc. being used on that endpoint computer system. In such an example, the operations of the endpoint computer system may not be protected against threats or other kinds of potentially malicious actions. However, if negative or unexpected outcomes occur, the harvested and stored data can be used to diagnose how an attack or other incident occurred and possibly to better inform other threat identification, detection, and/or prevention approaches. Additionally, the harvested and stored data may be used for other purposes, such as for example improving performance, assessing use of network and endpoint computer resources, etc. The descriptions herein with regards to examples of possible uses for the harvested and stored data are not intended to be limiting. The term "harvested" refers generally to any collection or generation of data relating to events occurring within an operating environment of an endpoint computer system (e.g. "forensic data" or other data useful in diagnosing, assessing, etc. one or more outcomes or occurrences on the endpoint computer).

Implementations of the current subject matter can provide one or more advantages relative to currently available approaches to computer forensic data collection. Such advantages can be provided by use of a local data store (which in some examples can be an audit log, but which generally refers to a collection of data reflecting actions, events, etc. relating to artifacts on the endpoint computer system) that is maintained locally on an endpoint computer system and which can be accessible for queries from a local user, a server that accesses the endpoint computer over a network, a computer program or process that provides threat protection (e.g. malware detection and/or interdiction, authentication verification and/or re-verification, etc.

In some implementations of the current subject matter, the local data store (e.g. an audit log) can be encrypted such that the harvested data contained therein are protected from alteration and so that the data cannot be readily accessed or otherwise compromised during or after a threat or other event that may require further analysis. A local audit log consistent with implementations of the current subject matter can also be protected against tampering (e.g. deletion of all or part of the data contained therein) by one or more tamper resistant features. Maintaining the audit log as a series or chain of linked data containers, each of which is encrypted and further secured by a cryptographic fingerprint, is one non-limiting example of a tamper resistant feature that can provide these protections.

The encrypting can prevent alteration of data in the audit log, and cryptographic fingerprints of the containers in the series can include anti-deletion features that clearly indicate if one or more containers in the series or chain is improperly deleted. These anti-deletion features can include inclusion (in the cryptographic fingerprint of each container) of a reference or references to the cryptographic fingerprint of at least one preceding container in the series. In other words, a currently active container can include as part of its cryptographic fingerprint a reference to at least the most recently closed container and optionally to more than one (e.g. two, three, four, five, ten, etc.) previously closed containers in the series. In this manner, if a container in the series is deleted, its absence will be readily apparent due to the deleted container being referenced in the cryptographic fingerprint of a later closed container or the currently active container.

In some implementations of the current subject matter, a cryptographic hash is stored in a container envelope, which can also include a fingerprint for both the current and one or more previous containers as well as the data included in the "chunk" of data being retained in that container. Use of a "chunked" approach to storage of the audit log information consistent with implementations of the current subject matter can allow differential backups, as it is generally necessary to back up only those new containers created and/or written to since a previous backup. This container approach can also address a potential technical challenge while encouraging information on a disk or other physical storage medium (e.g. a solid state drive, optical drive, or the like). Because data are continuously added to the audit log as operations of the endpoint computer and other actions and events occur, use of a single contiguous file for storing of audit log information can require that the single file be left open to allow this appending. Certain implementations of the current subject matter can address this potential issue through the use of a contiguous series of data containers in that data containers in the series that have been completed or otherwise filled can be permanently closed to further write operations while only the current container must be left open.

Other forms of tamper resistant features can also be used for the data containers. For example, each data container can also be compressed and signed with a public key (e.g. using RSA-4096 or some similar approach). The combination of the data container plus the signature can also be enciphered (e.g. using AES-256 or some similar approach).

An audit log consistent with implementations of the current subject matter can store raw forensic data in the aforementioned series of linked containers. Forensic data, as used herein, can generally include information about forensically interesting events. These forensic data (e.g. the information about forensically interesting events) can include information relevant to questions of who, what, why, how, and where relating to events occurring on the endpoint computer system. For example, "who" can include information about an actor responsible for actions that have occurred. An actor, as used herein, can refer to a user, a program, a function call, a thread, or some other process that causes an event to occur (e.g. a "what").

Information relating to "what" can include records of actions such as network connections, remote side port and/or Internet protocol (IP) addresses, domain name system lookups for a calling thread or process or source of a thread or a process, thread or process execution starts, file writing, URL calls, and the like. In some examples, recording of data on URL calls can require a browser plug-in. Data regarding an execution start can include information about any calling programs or routines in a process tree, and can include the name of a process, when the process started, and what if any parent processes are involved in the process tree. For example, if process C is started, data regarding a parent process B that called C can be relevant, as can a previous parent process A that called B. This information can be useful forensically as it can allow a reverse traversal of the process tree to find a true originating process and potentially (e.g. base don the content of the audit log) background information such as how the true originating process was first installed (or otherwise because present) on the endpoint computer.

Additionally potentially relevant forensic data can include information about the stage, which can generally refer to the context, state, etc. of the endpoint prior to and during a threat or attack. Stage information can include context around one or more actions or events, timing of a thread or process start (e.g. in relation to other threads or processes executing on the endpoint computer and/or other actions or events), a directory from which a thread or process launches, and other potentially interesting contextual information.

Figure 2:
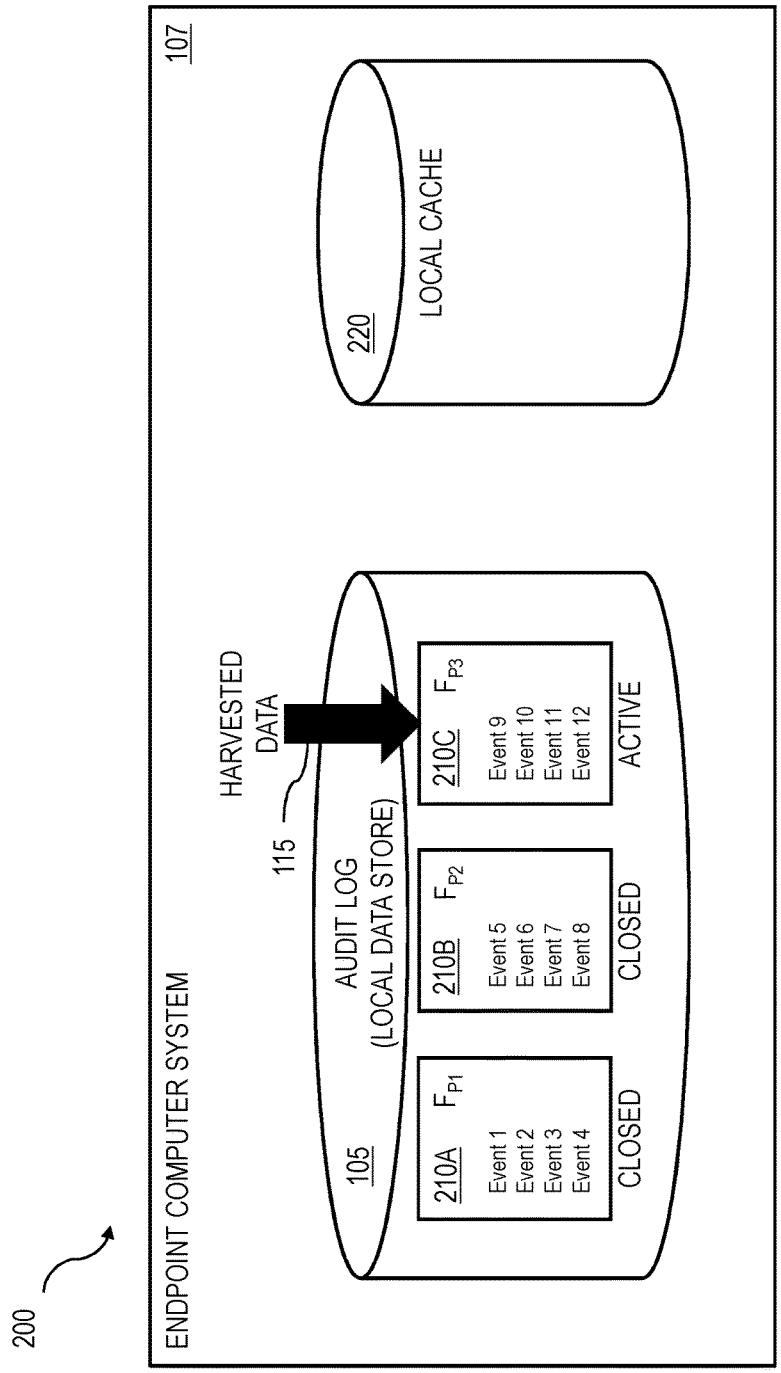
FIG. 2 shows a diagram illustrating features of another data recording approach consistent with implementations of the current subject matter.

The diagram 200 of FIG. 2 shows an example of a local data store/audit log 105 that includes a series of containers. Consistent with some implementations of the current subject matter, the audit log is maintained on a local storage of an endpoint computer system 107. However, it is not outside the scope of the current subject matter for the audit log to be stored on networked or other external storage that is not physically contained within the hardware of the endpoint computer system 107.

In the example of FIG. 2, three containers 210A, 210B, 210C are shown in the local data store/audit log 105. However, it will be readily understood that the series of containers can include any number of containers, and that the number of containers will continue to grow with time as additional events occur at the endpoint computer system 107 and are recorded in the local data store/audit log 105. One container (in this example container 210C) is a currently active container to which harvested data 115 are written. In some implementations of the current subject matter, a container can hold a preset amount of data. Alternatively, a container can be configured to hold all of the data generated by the computer system for a given period of time. When a container is full (e.g. when the preset amount of data is reached or if the predetermined period of time has elapsed), a new container is added to the end of the series of containers and forensic data are written to that new container. The containers 210A, 210B, 210C are all write-only as discussed above, such that data in a given container cannot be overwritten or deleted. The most recent forensic data are appended to the current active container 210C.

In addition to the local data store/audit log 105, which can be stored in a series of containers each including reference to a cryptographic fingerprint of at least one other container in the series as discussed above, FIG. 2 also shows a local cache 220 (which can also be referred to as a time-based local cache 220) that is also maintained on the endpoint computer system 107 concurrently with the writing of the audit log. Similarly to the audit log 105, it is not outside the scope of the current subject matter for the local cache 220 to be located on storage that is not physically contained within the hardware of the endpoint computer system 107. Unlike the local data store/audit log 105, the local cache 220 does not archive a continuous record of forensically relevant data. Instead, the local cache 220 stores a rolling snapshot of such data collected over a preset amount of time, over a preset number of events, over a present amount of stored forensic data, and/or combinations of such approaches immediately preceding the present time. In other words, in some implementations, the local cache 220 can store a trailing record of forensic data collected over the last five minutes (or any other amount of time, which can optionally be configurable). This trailing record of forensic data can include records regarding activities, actions performed, etc. relating to the system. The amount of time can be chosen to have a sufficient duration to capture data preceding some sort of interesting event that may be related to the event. In other examples, the local cache 220 can include a trailing record of a specified number of events or actions leading up to the present. As with the use of time for determining how long to retain forensic data in the local cache 220, the specified number of events can be chosen to be sufficient to capture forensic data preceding but relevant to an event. In still other examples, the local cache can have a fixed memory size that is chosen to be sufficient to retain relevant forensic data relating to and leading up to an event. The parameters of the local cache 220 can also optionally be chosen to incur an acceptably small burden on performance, storage, etc. of the endpoint computer 107.

If a local cache 220 is used, it can be written in a readily queryable format, such as for example as an indexed database (e.g. a BTREE-based date structure, although the approaches described herein are not data structure specific) and can optionally be accessible from a central server or other user interface UI), application programming interface (API), or the like for rapid review, analysis, etc. of data relating to a threat detection or prevention event or to some other unwanted occurrence on the endpoint computer system (or on other endpoint computer systems whose data the UI, API, etc. also accesses. The local cache 220 can also be reconstructed from an local data store/audit log 105 (e.g. the series of data containers 210A, 210B, 210C, etc.) in the event that the local cache 220 is damaged, deleted, or otherwise compromised.

In an alternative approach consistent with the current subject matter, the local data store is used directly for responding to queries. However, certain processing of the data retained in the local data store can be performed to enhance the speed of query responses and to improve the relevance of the data returned as responsive to a query. For example, one or more machine learning models can be used to analyze data as those data are added to the local data store and/or data that have been previously added to the local data store. The analyzing of the data can involve an assessment of the likelihood of a given subset of the data being relevant to events that are expected to be of greater interest.

Figure 3:
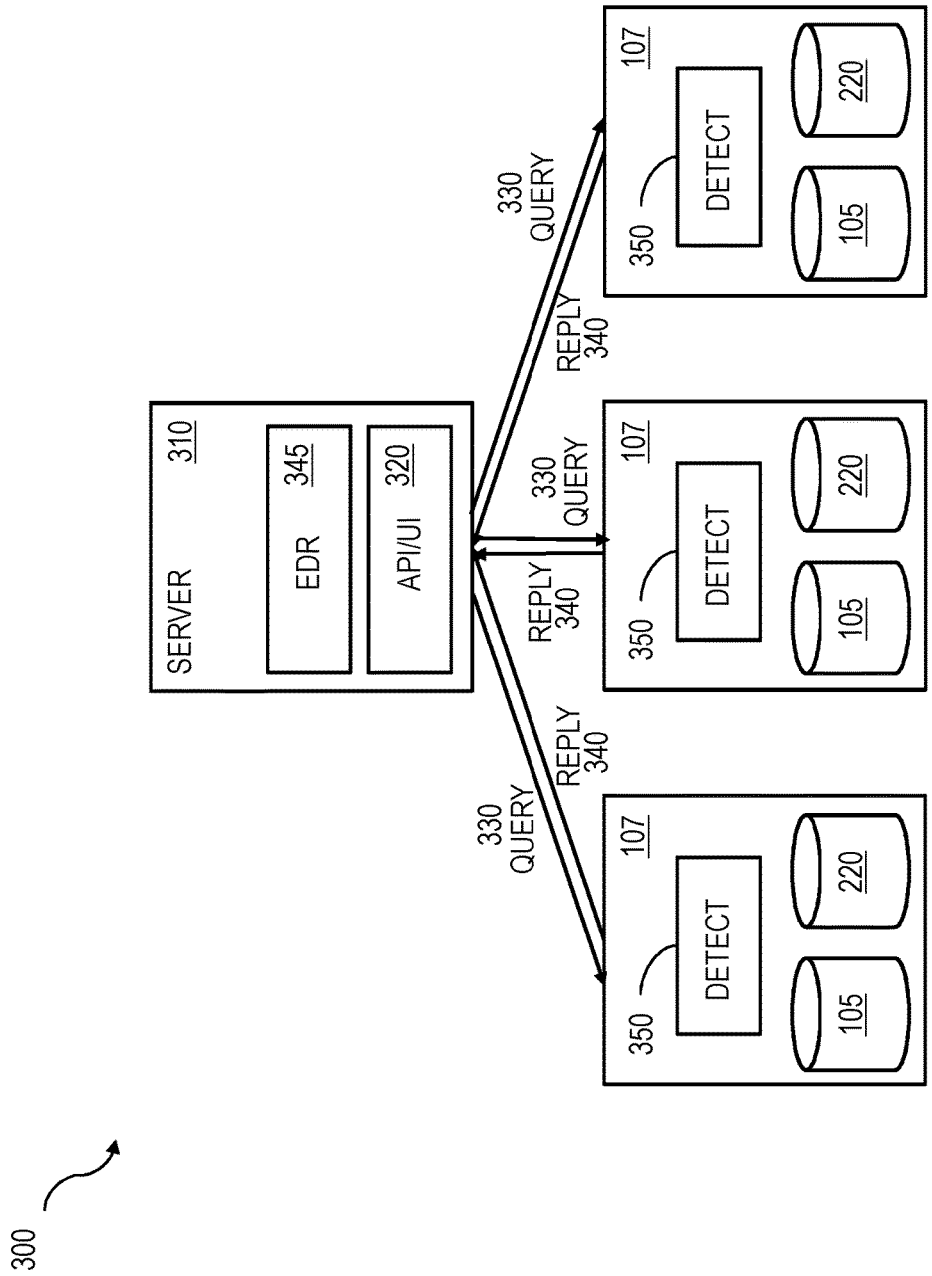
FIG. 3 shows a diagram illustrating aspects of a system showing features consistent with implementations of the current subject matter.

FIG. 3 shows a diagram 300 illustrating how data stored in the local data stores 105 or, alternatively, the local caches 220 if present), on multiple endpoint computers 107 can be queried on demand from a server 310 or other networked machine via an API (or optionally a UI) 320 to provide rapid response to support analyses of the harvested data (e.g. the computer forensic data retained on the endpoint computer systems 107). In this manner, and in contrast to existing approaches that rely on transmission to and storage at a central server for all such data as they are harvested, some implementations of the current subject matter can support at least some local analysis of harvested data for threat evaluation and/or for other purposes. In some implementations of the current subject matter, the API or UI 320 running at the server 310 can send queries 330 of the local data store (or, alternatively, the local cache 120, if one is present) at one or more endpoint computer systems 107 and receive query replies 340. It will be understood that the local data store/audit log 105 can also or alternatively be queried from another process running on the endpoint computer system itself, such as for example a malware detection and/or interdiction process, a user authentication process, a user authentication re-verification process, or the like.

Other data schema and routing of queries and responses are also within the scope of the current subject matter. In operation, a networked query approach as described above can be useful in gathering and/or aggregating relevant summary date regarding events at endpoint computers 107. These query replies 340 can be used in a number of possible ways. In some implementations of the current subject matter, the query replies 340 can be used as input data for improvement of an endpoint detection and response model (EDR) 345, which can be implemented at the server 310 or on another computer. In other implementations, queries 330 can be triggered by receipt of a report of a recent or in-progress threat or attack on one or more of the endpoint computers 107 and/or as a result of detection of a trend or other emergent situation that may indicate surreptitious or undesirable activity but that may not constitute a threat or attack per se. The query replies 340 can used to gather data on the nature of the attack or threat and potentially to direct a response (e.g. an alert provided to a network administrator, an automated security protocol that the endpoint computers 107 are directed to implement, etc.). The summary data (e.g. the query replies 340) transmitted back to the server 310 in response to the queries 330 can optionally include only extracted or aggregated data as opposed to the raw harvested data that is included in the local data store/audit log 105. In this manner, the raw harvested data does not need to be transmitted from the endpoint computer 107, thereby ensuring data security and avoiding potential vulnerabilities that might arise due to transmission of raw harvested data over a network.

In a further implementation of the current subject matter, a data collection approach consistent with the above descriptions above can be further enhanced by inclusion of a threat detection or prevention module 350 or other software functionality on the computer endpoint 107. The threat detection module 350 can include artificial intelligence, a static set of response criteria, or other computing features that operate to expand the scope of the data that are stored in the local data store/audit log 105 in response to detection of one or more criteria indicative of a threat or an attack. In other words, while the endpoint computer 107 is perceived by the detection module 350 to be operating in a non-threat or non-attack mode, a first level of data collection can be used for storing data to the local data store/audit log 105. If the threat detection module 350 determines that a threat or an attack may be underway or may be imminent, the threat detection module 350 can perform one or more actions, such as for example directing the local data store/audit log 105 to harvest data with added details or to add a finer level of resolution and/or causing a change in aggregation and analysis of the harvested data. In various implementations of the current subject matter, a threat detection module 350 can include one or more of a malware detection and/or interdiction process, a user authentication process, a user authentication re-verification process, or the like.

Consistent with the use of a threat detection module 350 as discussed above, the harvesting of data to be added to the local data store/audit log 105 can be tuned such that the data consumption and or computational power required for maintenance of the local data store/audit log 105 is minimized during periods during which the likelihood of a threat or other attack is low. When the threat detection module 350 indicates that a heightened level of alert is necessary, the local data store 105 can harvest larger amounts of data, which would lead to lowered performance of the computer endpoint 107. Additionally or alternatively, at a higher level of alert, additional processing power can be required for aggregation of atomic events into logical views. However, the reduced performance can be a reasonable trade-off for the ability to collect important data around a threat or an attack.

In some implementations of the current subject matter, the threat detection module 350 can also include functionality capable of terminating or remediating threats, and can be capable of doing so from either or both of a lower or heightened level of alert. In addition, such functionality can be capable of determining that a current level of alert is not commensurate with an actual threat state and therefore lowering the current level of alert to improve system (e.g. CPU) performance.

Reference in the preceding paragraphs to harvesting and/or analysis, aggregation, etc. of data with added detail or added complexity, granularity, etc. can optionally refer to implementation of a broader set of data criteria for collection in the local data store/audit log 105. In other words, the local data store/audit log 105 can include a first set of data collection criteria that are used during non-threat or non-attack periods, and a second set of data collection criteria that are put into operation when the threat detection module 350 indicates that a threat or attack is in progress, might be imminent, has just occurred, etc. Also as noted above, first analysis and/or aggregation criteria can be applied during "normal" periods, which enhanced, second analysis and aggregation criteria can be applied when the threat detection module 350 indicates that a threat or attack is in progress, might be imminent, has just occurred, etc. While the threat detection module 350 is shown in FIG. 3 as being implemented on the endpoint computers 107, it is within the scope of the current subject matter for this functionality to be implemented at the server 310 or at some other external computing machine.

Figure 4:
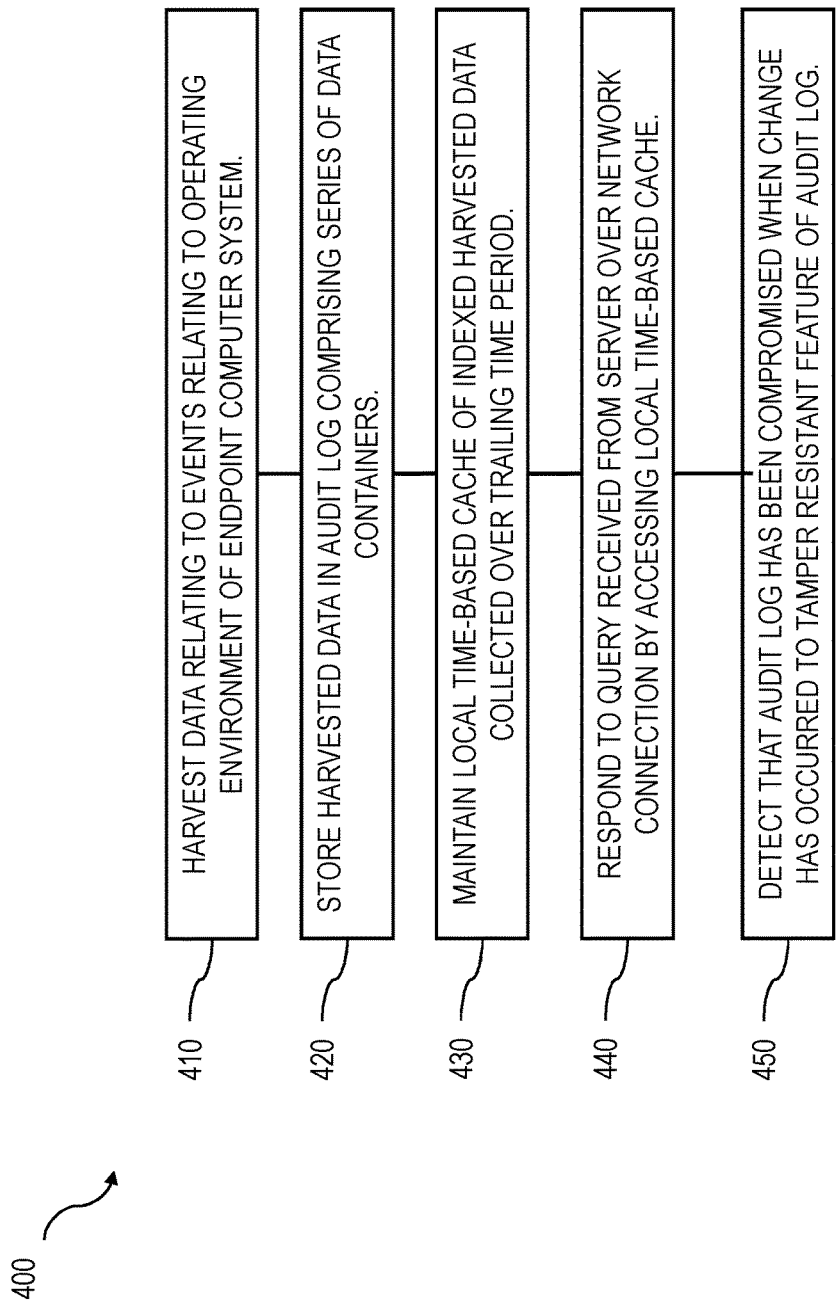
FIG. 4 shows a process flow diagram illustrating aspects of a method having one or more features consistent with implementations of the current subject matter.

FIG. 4 shows a process flowchart 400 that illustrates features of a method consistent with implementations of the current subject matter. At 410, an endpoint computer system generates (e.g. harvests) data relating to a plurality of events relating to an operating environment of the endpoint computer system. The generated data are stored in an audit log (e.g. a local data store) at 420. The audit log can include a series of data containers, and each data container in the series (other than a first data container in the series) can include a tamper resistant feature (e.g. a cryptographic fingerprint which can reference at least one prior data container in the series). Currently generated data can be stored in a current data container of the series while preceding data containers in the series are closed to further write operations. As noted above, each data container can also be compressed and signed, and the combination of the data container plus the signature can further be enciphered. Other examples of tamper resistant features can include identification of ciphers, signature, timestamps, etc. for which a failure or an unauthorized modification can indicate the occurrence of tampering with the audit log.

At 430, a local cache of indexed harvested data collected over a trailing time period is maintained. A response to a query received from a server over a network connection can be provided at 440 by accessing the local cache.

At 450, detection that the audit log has been compromised occurs. This detection can occur, for example, when a data container of the series of data containers is referenced in the cryptographic fingerprint of a following data container but no longer present in the audit log. Additionally or alternatively, as each data container can be treated as an enciphered and signed "black box," tampering detection need not be limited to detecting that a given data container is no longer present. Detection that the audit log may have been compromised can include detection of a cipher failure, a signature failure, a modified timestamp, etc. Upon detecting that the audit log may have been compromised, an alert can be generated at 460 for sending to an administrator, or other actions can be taken.

Figure 5:
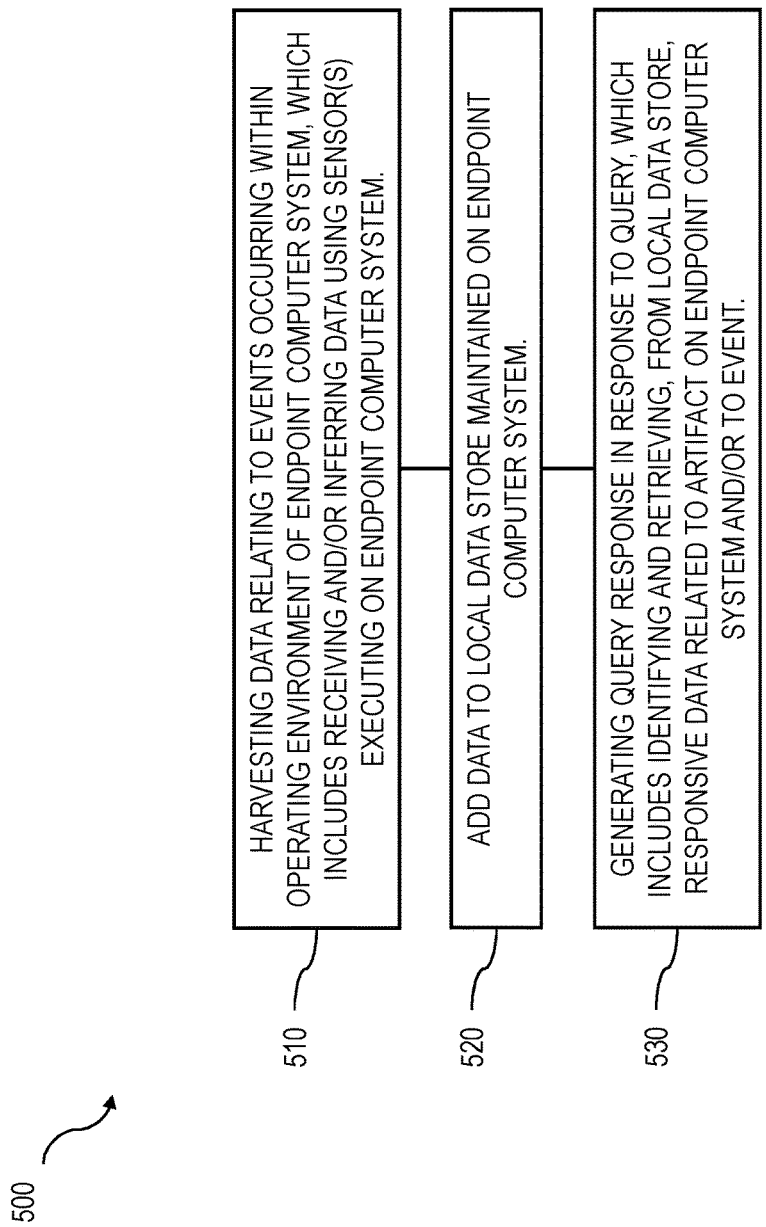
FIG. 5 shows a process flow diagram illustrating aspects of a method having one or more features consistent with implementations of the current subject matter.

FIG. 5 shows a process flow chart 500 illustrating features that can be included in a method consistent with implementations of the current subject matter. At 510, data relating to a plurality of events occurring within an operating environment of an endpoint computer system can be harvested by the endpoint computer system. The harvesting includes receiving and/or inferring, etc. the data from one or more sensors that execute on the endpoint computer system. As used herein, harvesting refers to activities that can include directly generating data, calculating or otherwise inferring data based on data that are directly generated, or other activities that result in data about events occurring within the endpoint computer system operating environment. Events generally refer to an action that occurs and that involves one or mores. Events are atomic (e.g. self-contained), individual captures of what has happened at a specific point in time within the endpoint computer system's operating environment. An artifact refers generally to any kind of digital item of interest (e.g. for forensic assessment of occurrences such as malware attacks, software errors, performance issues, etc.). Artifacts can include files, programs, system characteristics, or the like.

In some implementations of the current subject matter, the harvested data can include or be inferred, calculated, etc. from data that do not originate from sensors executing on the endpoint computer system. For example, the harvested data can include or be inferred from data collected or generated by one or more sensors external to the endpoint computer system, such as for example network traffic sensors, sensors or calculations of distributed usage of processor capacity, network sensors, sensors on non-endpoint computer systems (e.g. servers cloud computing nodes, etc.), or the like.

At 520, the data are added to a local data store maintained on the endpoint computer system. In some examples, the local data store can be a database with a data structure configured to support querying of the harvested data.

At 530, a query response is generated, for example by the endpoint computer system identifying and retrieving responsive data from the local data store. The responsive data are related to an artifact on the endpoint computer system and/or to an event of the plurality of events.

Data containers (e.g. one or more files within which a local data store and/or audit log is maintained) can also be protected against tampering consistent with implementations of the current subject matter through kernel enforced access control. If a thread, process, or other routine, etc. attempts to modify a data container, one or more actions can be triggered to quarantine the thread, process, or routine. Additional approaches can include protection (or otherwise prevention of corruption of) the stream of forensic data that are used to generate the local data store/audit log 105 and local cache 220.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like. Such examples are merely for illustration purposes and are not intended to be limiting. In general, the current subject matter relates to approaches for aggregating, analyzing, and further interpreting results into formats consumable by proprietary and third-party applications for further interpretation, display, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
computer hardware having at least one data processor and memory storing instructions which, when executed by the at least one data processor, result in configured to perform operations comprising:
harvesting, by an endpoint computer system, data relating to a plurality of events occurring within an operating environment of the endpoint computer system, the harvesting comprising receiving and/or inferring the data using one or more sensors executing on the endpoint computer system;
adding the data to a local data store maintained on the endpoint computer system, the local data store comprising an audit log, the audit log comprising a series of data containers, each data container in the series comprising a tamper resistant feature, currently generated forensic data being stored in a current data container of the series while preceding data containers in the series are closed to further write operations;
generating a query response in response to a query specifying an artifact on the endpoint computer system and/or an event of the plurality of events, the generating comprising identifying and retrieving responsive data from the local data store, the responsive data being related to the artifact on the endpoint computer system specified by the query and/or to the event of the plurality of events specified by the query, the generating further comprising mitigating an amount of the data returned as part of the responsive data, the mitigating comprising interpreting the query at the endpoint computer system and focusing on specific data of the responsive data that are most likely to be relevant to a subject of the query; and
taking an action based on the detecting that the audit log has been compromised, the action comprising one or more of:
quarantining a thread, process, and/or routine responsible for the compromising of the audit log; and
protection and/or other prevention of corruption of the forensic data that are used to generate the audit log and local cache.

2. A system as in claim 1, wherein the artifact comprises a digital item of interest comprising one or more of a file, a programs, and a system characteristic.

3. A system as in claim 1, further comprising detecting that the audit log has been compromised based on a change in the tamper resistant feature.

4. A system as in claim 1, wherein the tamper resistant feature comprises a cryptographic fingerprint that references at least one prior data container in the series, and wherein the change in the tamper resistant feature comprises a data container of the series of data containers being referenced in the cryptographic fingerprint of a following data container but no longer being present in the audit log.

5. A system as in claim 1, wherein the tamper resistant feature comprises data compression and signing with a public key and/or enciphering of a combination of the data container plus a signature comprising the public key.

6. A system as in claim 1, wherein the audit log and the local cache are both stored on the endpoint computer.

7. A system as in claim 1, wherein each data container of the series of data containers in the audit log is encrypted and wherein the forensic data are written to the current data container in an append-only manner.

8. A system as in claim 1, wherein the harvesting further comprises receiving and/or inferring at least some of the data using additional data generated external to the endpoint computer system.

9. A system as in claim 1, wherein the adding of the data to the local data store further comprises determining, based on one or more criteria, to retain in the local data store a first subset of the data as more likely to be relevant and to exclude from the local data store and a second subset of the data as more likely to be irrelevant.

10. A system as in claim 1, wherein the event comprises an action occurring on the endpoint computer system and involving one or more artifacts on the endpoint computer system and/or wherein the event comprises a capture of what occurred at a specific point in time relating to the at least one artifact.

11. A system as in claim 1, wherein the responsive data comprises one or more of one or more times that a particular file was accessed on the endpoint computer system, how the particular file was used on the endpoint computer system, when the particular file was first detected on the endpoint computer system, location of a registry persistence point, and use of a registry by a software routine to allow itself to persist after a reboot of the endpoint computing system.

12. A system as in claim 1, wherein the one or more sensors comprises at least one of a kernel mode collector, a removable media sensor, a sensor that collects data about a current state of a computing environment executing on the endpoint computer, a malware detection and/or interdiction process, a user authentication process, and a user authentication re-verification process.

13. A system as in claim 1, wherein the operations further comprise:
harvesting the data according to a first set of data collection criteria;
determining, via a threat detection module, that a heightened level of alert is necessary based on a determination that data stored in the audit log indicates that a threat or an attack is underway or imminent; and
in response to the a heightened level of alert, harvesting the data according to a second set of data collection criteria, wherein the second set of data collection criteria is put into operation when the threat detection module indicates that a threat or attack is (i) in progress, (ii) might be imminent, or (iii) has just occurred, and directs the system to harvest data with (a) added detail, (b) added complexity and/or (c) granularity.

14. A system as in claim 13, wherein the threat detection module comprises a machine learning component.

15. A system as in claim 14, wherein the machine learning component performs at least one operation selected from determining that the heightened level of alert is necessary, blocking or terminating execution of a process or thread, and determining that the alert level can be lowered back to the first set of data collection criteria.

16. A system as in claim 14, wherein the machine learning component accomplishes the at least one operation by processing data already in the local data store to determine that a potentially undesirable event has occurred and/or by processing the harvested data as it is received to determine that a potentially undesirable event is currently occurring.

17. A non-transitory computer readable medium storing instructions that, when executed by one or more programmable processors, cause the one or more programmable processors to perform operations comprising:
   harvesting, by an endpoint computer system, data relating to a plurality of events occurring within an operating environment of the endpoint computer system, the harvesting comprising receiving and/or inferring the data using one or more sensors executing on the endpoint computer system;
   adding the data to a local data store maintained on the endpoint computer system, the local data store comprising an audit log, the audit log comprising a series of data containers, each data container in the series comprising a tamper resistant feature, currently generated forensic data being stored in a current data container of the series while preceding data containers in the series are closed to further write operations;
   generating a query response in response to a query specifying an artifact on the endpoint computer system and/or an event of the plurality of events, the generating comprising identifying and retrieving responsive data from the local data store, the responsive data being related to the artifact on the endpoint computer system specified by the query and/or to the event of the plurality of events specified by the query, the generating further comprising mitigating an amount of the data returned as part of the responsive data, the mitigating comprising interpreting the query at the endpoint computer system and focusing on specific data of the responsive data that are most likely to be relevant to a subject of the query; and
   taking an action based on the detecting that the audit log has been compromised, the action comprising one or more of:
      quarantining a thread, process, and/or routine responsible for the compromising of the audit log; and
      protection and/or other prevention of corruption of the forensic data that are used to generate the audit log and local cache.

18. A computer-implemented method comprising:
   harvesting, by an endpoint computer system, data relating to a plurality of events occurring within an operating environment of the endpoint computer system, the harvesting comprising receiving and/or inferring the data using one or more sensors executing on the endpoint computer system;
   adding the data to a local data store maintained on the endpoint computer system, the local data store comprising an audit log, the audit log comprising a series of data containers, each data container in the series comprising a tamper resistant feature, currently generated forensic data being stored in a current data container of the series while preceding data containers in the series are closed to further write operations;
   generating a query response in response to a query specifying an artifact on the endpoint computer system and/or an event of the plurality of events, the generating comprising identifying and retrieving responsive data from the local data store, the responsive data being related to the artifact on the endpoint computer system specified by the query and/or to the event of the plurality of events specified by the query, the generating further comprising mitigating an amount of the data returned as part of the responsive data, the mitigating comprising interpreting the query at the endpoint computer system and focusing on specific data of the responsive data that are most likely to be relevant to a subject of the query; and
   taking an action based on the detecting that the audit log has been compromised, the action comprising one or more of:
      quarantining a thread, process, and/or routine responsible for the compromising of the audit log; and
      protection and/or other prevention of corruption of the forensic data that are used to generate the audit log and local cache.

* * * * *